(12) United States Patent
Aoki

(10) Patent No.: US 8,334,942 B2
(45) Date of Patent: Dec. 18, 2012

(54) BACKLIGHT DEVICE AND LIQUID CRYSTAL DISPLAY

(75) Inventor: Tomio Aoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 860 days.

(21) Appl. No.: 11/369,608

(22) Filed: Mar. 7, 2006

(65) Prior Publication Data
US 2006/0203513 A1    Sep. 14, 2006

(30) Foreign Application Priority Data

Mar. 8, 2005   (JP) ................ P2005-064344

(51) Int. Cl.
*G02F 1/1335*   (2006.01)
*F21V 7/04*   (2006.01)

(52) U.S. Cl. ........... 349/62; 349/64; 349/65; 349/69; 362/561; 362/612; 362/615; 362/628

(58) Field of Classification Search ........... 349/61–71; 362/600–634, 561
See application file for complete search history.

(56) References Cited

U.S. PATENT DOCUMENTS

| | | | |
|---|---|---|---|
| 6,607,286 B2 | 8/2003 | West et al. | |
| 6,679,621 B2 | 1/2004 | West et al. | |
| 7,195,364 B2 * | 3/2007 | Hahm et al. | 362/27 |
| 2002/0163808 A1 | 11/2002 | West et al. | |
| 2003/0128307 A1 * | 7/2003 | Ito et al. | 349/58 |
| 2004/0080938 A1 * | 4/2004 | Holman et al. | 362/231 |
| 2004/0130515 A1 * | 7/2004 | Chuang et al. | 345/82 |
| 2005/0007516 A1 | 1/2005 | Hong et al. | |
| 2005/0018106 A1 * | 1/2005 | Wang et al. | 349/96 |
| 2005/0122707 A1 * | 6/2005 | Kim | 362/29 |

FOREIGN PATENT DOCUMENTS

| | | |
|---|---|---|
| EP | 1231430 | 1/2002 |
| EP | 1376708 | 6/2003 |
| EP | 1 640 756 | 3/2006 |
| JP | 08-136917 | 5/1996 |
| JP | 08136917 A * | 5/1996 |
| JP | 10-082915 | 3/1998 |
| JP | 2001-351424 | 12/2001 |
| JP | 2003-008068 | 1/2003 |
| JP | 2004-133391 | 4/2004 |
| JP | 2004-302067 | 10/2004 |
| JP | 2004-349251 | 12/2004 |
| WO | 02/081929 | 10/2002 |
| WO | 02-081929 A2 | 10/2002 |

OTHER PUBLICATIONS

Japanese Office Action for corresponding JP2005-064344 issued on Apr. 20, 2010.

* cited by examiner

*Primary Examiner* — Jessica M Merlin
(74) *Attorney, Agent, or Firm* — K&L Gates LLP

(57) ABSTRACT

A backlight device and a liquid crystal display are provided. A liquid crystal display apparatus including a direct backlight device which has an LED assembled into a light-guiding plate and in which an brightness uniformity is controlled or improved is provided by controlling or improving the brightness uniformity.
A backlight device 10 includes a light emitting diode 21 as a light source assembled into a light-guiding plate 30, in which an edge portion 32 on the bottom surface 30B side of a concave portion 31 in a light-guiding plate 30, where the light emitting diode 21 is assembled, is formed at to have the shape of an inclined or curved surface that has an angle except a right angle with respect to the bottom surface 30B.

7 Claims, 4 Drawing Sheets

BACKLIGHT DEVICE AND LIQUID CRYSTAL DISPLAY

CROSS REFERENCES TO RELATED APPLICATIONS

The present application claims priority to Japanese Patent Application JP 2005-064344 filed in the Japanese Patent Office on Mar. 8, 2005, the entire contents of which is being incorporated herein by reference.

BACKGROUND

The present invention relates to a back-light device particularly suitable for being applied to a transmissive liquid crystal display apparatus, and a liquid crystal display apparatus.

Recently, a display device made considerably thin such as an LCD (Liquid Crystal Display), PDP (Plasma Display Panel) and the like is proposed and commercially available as the display device replacing a CRT (Cathode Ray Tube) for a television receiver. Particularly, since an LCD apparatus using an LCD panel is capable of being driven by low power consumption and a large-sized LCD panel has become capable of being manufactured at low costs, the LCD apparatus using an LCD panel has been widely used and the technical research and development is advanced.

The above LCD apparatus mainly uses a backlight system in which a color image is displayed by a backlight device that illuminates the whole rear surface of the transmissive LCD panel including a color filter from a rear side.

A CCFL (Cold Cathode Fluorescent Lamp) which emits white light by using a fluorescent tube and an LED (Light Emitting Diode) are considered to be promising as a light source of the backlight device (refer to Patent Document 1, for example).

Particularly, with development of a blue LED, respective LEDs of emitting red light, green light and blue light that are three primary colors in light are prepared, and white light with high color purity can be obtained by mixing red light, green light and blue light emitted therefrom. Therefore, with those LEDs being a light source of the backlight device, color purity through an LCD panel becomes high and so the achievable color gamut can be greatly expanded in comparison with a CCFL. Further, luminance of the backlight device can greatly be improved by using an LED chip of high power.

As described above, in the case in which an LED is used as the light source of the backlight device, when the LED is arranged directly under the light-emitting surface, namely, when a direct type LED is employed, brightness and color uniformity may be worse because the LED is a point source of light.

As a method to solve the above problem, it is conceivable to enlarge the distance between the LED and a diffusion plate, however, as a result, the thickness of the backlight may become extremely large in comparison with the backlight using a CCFL. Further light weight and thin shape have become indispensable in the LCD apparatus and the further thin shape is desired also in the backlight.

Then, as a method to decrease the thickness, a structure is proposed in which a light-guiding plate is used to make light from the light source arranged at a part of the plate reflect multiple times to obtain a surface light source. In other words, the light-guiding plate is used to make the backlight thin and to improve the uniformity of brightness.

Patent Document 1: Published Japanese Patent Application No. H8-136917.

SUMMARY

As described above, for example, in the case where the light-guiding plate is used in the direct backlight using the LED, which is considered to be applied to an LCD apparatus and LCD panel thin-shape TV and the like, there are such problems that if brightness uniformity is improved, it becomes difficult to extract light from the light-guiding plate, and if the extraction of light is enlarged, brightness uniformity may deteriorate.

Regarding the above, in the case where a light-guiding plate is used, a mirror is used on the bottom surface that is the rear surface opposite to the light-emitting surface and on the side surface of the light-guiding plate and a diffusion sheet is used on the top surface that is light-emitting surface to extract light on the liquid crystal display panel side. However, brightness uniformity becomes deteriorated and luminance may decrease depending on the way of selecting the diffusion sheet on the top surface. This is because the diffusion sheet on the top surface diffuses light from the LEDs and also has a function of extracting a part of light to the outside, there is a trade-off between the brightness uniformity and brightness output depending on the characteristics of the diffusion sheet, and therefore the coexistence of brightness uniformity and brightness output is difficult.

Particularly, amount of light emitted to the outside from the diffusion sheet on the top surface is large in the surroundings of the LED, which causes decrease of the brightness uniformity.

The present invention addresses the above-identified and other problems associated with conventional methods and apparatuses and provides an LCD apparatus with controlled or improved brightness uniformity, including a direct backlight device in which the LED is assembled into a light-guiding plate and in which brightness uniformity is controlled or improved while retaining or improving the luminance.

A backlight device according to an embodiment of the present invention includes a light emitting diode as a light source assembled into a light-guiding plate, in which an edge portion on the bottom surface side of a concave portion, where the light emitting diode is assembled, in the light-guiding plate is formed to have the shape of an inclined or curved surface that has an angle except a right angle with respect to the bottom surface.

Further, a liquid crystal display apparatus according to an embodiment of the present invention includes a backlight device having the above-described structure of the present invention.

As described above, in the backlight device according to an embodiment of the present invention, the shape of the concave portion in which the light emitting diode of the light source is assembled is made to be the shape including an inclined or curved surface that has an angle except a right angle with respect to the bottom surface, wherein, for example, a conical curved surface or a pyramid-shape slope are provided at the edge portion of a cylindrical shape or square column shape on the bottom surface side in the concave portion.

As described above, according to an embodiment of the present invention, since a surface that has a certain angle to the bottom surface is provided at the edge portion of the concave portion, light emitted toward the bottom surface side from a light emitting diode (LED) is reflected upward by the edge portion, namely, enters the light-guiding plate with an angle away from the bottom surface. Therefore, light emitted toward the bottom surface side from the LED reaches the bottom surface at a position away from the LED and the range thereof is expanded and so distribution of light beams that directly reach the bottom surface is reduced, and consequently the brightness uniformity in the surroundings of the LED can be controlled and improved.

As explained above, according to an embodiment of the backlight device and the liquid crystal display (LCD) apparatus of the present invention, luminance can be maintained or increased, and brightness uniformity caused in the surroundings of the LED can be controlled or improved.

Additional features and advantages are described herein, and will be apparent from, the following Detailed Description and the figures.

DETAILED DESCRIPTION

Hereinafter, preferred embodiments to carry out the present invention are explained, however, the present invention is not limited to the following embodiments.

At first, an embodiment of a transmissive LCD apparatus to which a backlight device according to the present invention is suitably applied is explained with reference to a schematic constitutional view of FIG. 1.

Figure 1:
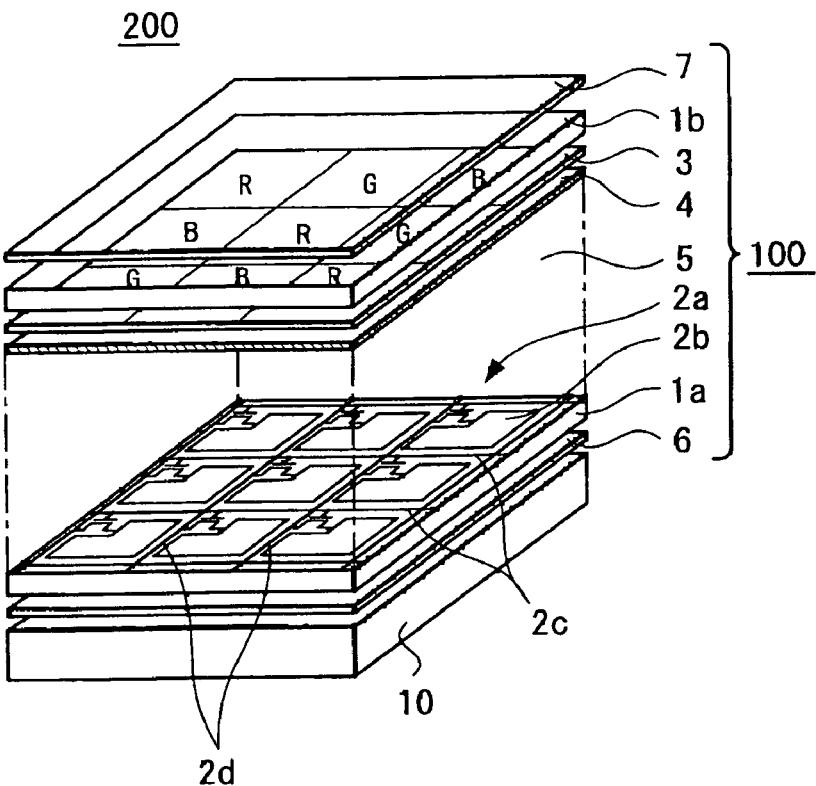
FIG. 1 is an exploded constitutional view schematically showing an LCD apparatus according to an embodiment of the present invention.

As shown in FIG. 1, a transmissive LCD apparatus 200 includes a transmissive LCD panel 100 and a backlight device 10 provided on the rear surface side thereof. Although not shown in the figure, the LCD apparatus 200 may also include: a reception portion such as an analogue tuner or digital tuner that receives a terrestrial wave or satellite wave, a video signal processing portion and audio signal processing portion that process a video signal and audio signal received by the reception portion, respectively, and an audio signal output portion such as a speaker that outputs the audio signal processed in the audio signal processing portion.

This embodiment shows a case of the LCD apparatus of an active matrix drive method and on a first substrate $1a$ made of glass or the like are formed a TFT (Thin Film Transistor) $2a$ provided for each pixel to select the pixel and a pixel electrode $2b$ connected to a drain area of the TFT $2a$. In the boundary portion of each pixel are formed a gate bus line $2c$ connected to a gate electrode of the TFT $2a$ and a source bus line $2d$ connected to a source area of the TFT $2a$ in a lattice shape such that each pixel can be connected.

On the other hand, on a second substrate $1b$ made of glass or the like is formed a color filter 3 of three colors of red (R), green (G) and blue (B) alternately for each pixel, and a common electrode 4 is integrally formed with respect to a plurality of pixels in the upper layer. In FIG. 1, although only nine pixels of 3×3 are shown, a color filter is provided to display m×n pixels, in actuality. The first substrate $1a$ and the second substrate $1b$ are arranged in parallel with a predetermined gap in between such that the pixel electrode $2b$ and the common electrode 4 are faced to each other, and into a space between the obtained pixel electrode $2b$ and the common electrode 4 is enclosed a liquid crystal 5 to be held between the liquid crystal orientation films not shown in the figure.

Further, a polarizing plate 6 and a backlight device 10 that emits white light are arranged on the rear surface side of the first substrate $1a$, which is the side opposite to the surface where the pixel electrode $2b$ is formed, and a polarizing plate 7 is arranged on the rear surface side of the second substrate $1b$, which is the side opposite to the surface where the common electrode 4 is formed.

Figure 2:
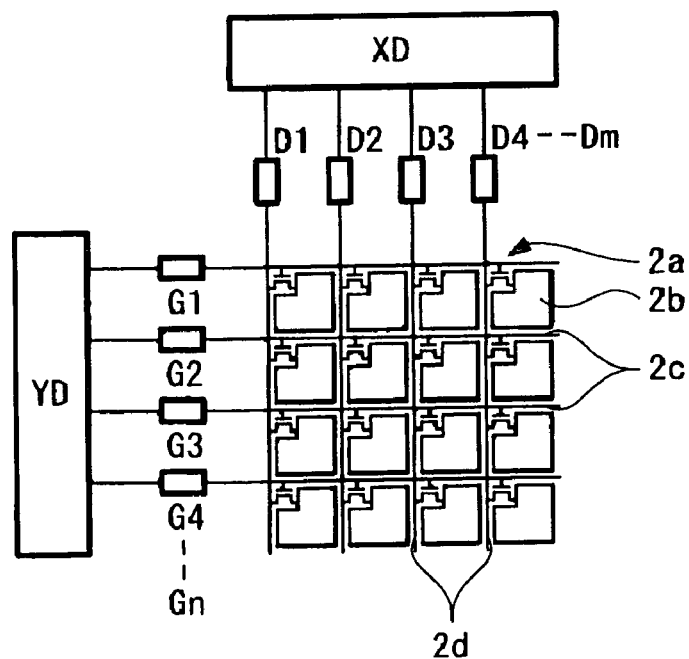
FIG. 2 is a constitutional view schematically showing a relevant part of an embodiment of a LCD apparatus.

FIG. 2 shows arrangement of a liquid crystal drive electrode and TFT. In FIG. 2, although sixteen pixels of 4×4 are shown, m×n pixels are arranged to be shown, in actuality. As described above, the TFT $2a$ and the pixel electrode $2b$ are arranged for each pixel on a surface of the first substrate $1a$, and the gate bus line $2c$ and the source bus line $2d$ are formed in the shape of a lattice at the boundary portion of respective pixels. The liquid crystal drivers that include a X-driver XD and Y-driver YD are arranged at the outer frame portion or the like of a liquid crystal screen, and the above gate bus lines $2c$ are connected to the Y-driver YD through the selection circuits G1 to Gn. On the other hand, the source bus lines $2d$ are connected to the X-driver XD through the selection circuits D1 to Dm.

Here, the TFT $2a$ is an active element having the functions of connecting each pixel electrode $2b$, which applies an electric field to the liquid crystal 5, to the source bus line $2d$ that is a data electrode and of disconnecting each pixel electrode from the source bus line in accordance with a signal of the gate bus line $2c$, and the liquid crystal of each pixel can be driven selectively. Light from the back light device 10 transmitted through the polarizing plate 6 is transmitted through the liquid crystal 5, while transmissivity thereof is controlled by the liquid crystal portion selected and driven by the above-described selection circuit, and is further transmitted through the color filter 3 of each color and the polarizing plate 7 to form a color image on the polarizing plate 7 side. With this, a liquid crystal display of high image quality having high contrast and operating at high speed can be obtained.

Further, in the above-described embodiment, although an example of the LCD apparatus according to the active matrix drive method was explained, needless to say, the backlight device and LCD apparatus of the present invention can be applied to other LCD apparatuses of various drive methods and structures such as an LCD apparatus of a simple matrix drive method and the like.

Figure 3:
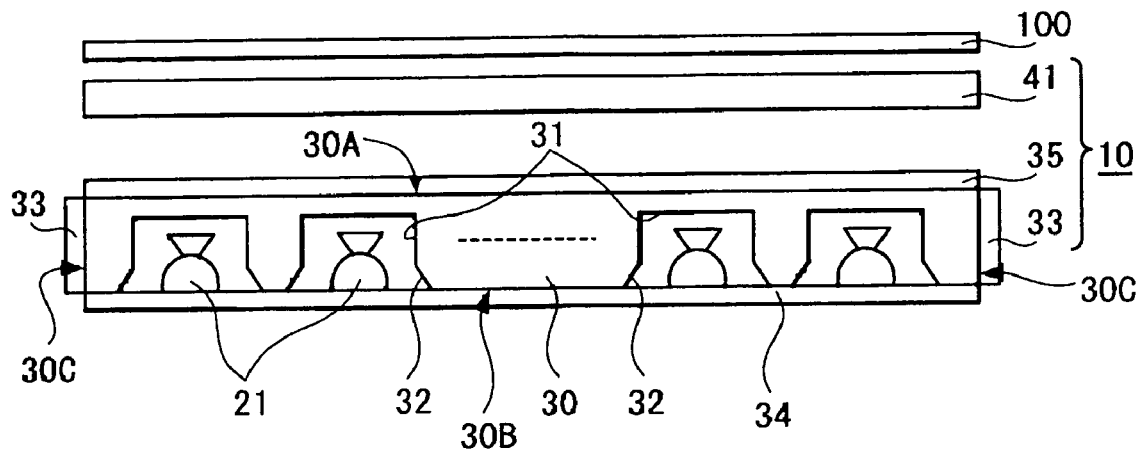
FIG. 3 is a constitutional view schematically showing a section of a relevant part of a backlight device according to an embodiment of the present invention.

FIG. 3 is a constitutional view schematically showing a section of a relevant part of a backlight device 10 according to an embodiment of the present invention. As shown in FIG. 3, the backlight device 10 according to an embodiment of the present invention is an example in which a concave portion 31 having, for example, a cylindrical shape that houses an LED (light Emitting Diode) 21 in a light-guiding plate 30 is provided at a bottom surface 30B opposite to a top surface 30A that is a light-emitting surface, and an edge portion 32 of the concave portion 31 on the bottom surface 30B side is formed as an inclined or curved surface that has an angle except a right angle with respect to the bottom surface 30B, and as a conical curved surface in an example shown in the figure.

As a material of the light-guiding plate 30, a colorless and transparent resin, for example, an acrylic resin that has a light transmissivity in a wavelength band for use can be used.

Further, the concave portions 31 are provided at the bottom surface 30B of the light-guiding plate 30 at regular intervals in line, for example, and a red LED, green LED and blue LED (not shown in the figure) are arranged, for example, in this order in those concave portions 31 to be assembled into the light-guiding plate 30.

FIG. 3 shows a vertical section where LEDs 21 of each color are arranged in parallel, and similarly, LED lines are provided in the vertical direction with respect to the paper surface of FIG. 3, for example, to form a surface light source in which the LEDs 21 are arranged to make a surface as a whole.

Further, in this embodiment, a diffusion reflection structure portion 34 made of a diffusion sheet or the like and a reflection structure portion 33 made of a reflection sheet or the like are attached to the bottom surface 30B and to the side surface 30C of the light-guiding plate 30 through an adhesive, respectively.

Furthermore, a low diffusion structure portion 35 made of a low diffusion sheet or the like is also attached to the top surface 30A of the light-guiding plate 30 through an adhesive, for example.

A diffusion plate 41 that diffuses light emitted from the light-guiding plate 30 is provided between the light-guiding plate 30 and the upper LCD panel 100. Note that, although not shown in the figure, in order to convert the surface light emitted from the backlight device 10 into the illumination light having an optimal optical characteristic for the LCD panel 100, for example, on the upper surface or on the lower side of the diffusion plate 41 may be provided an optical sheet group. The optical sheet group may include sheets having: a function of resolving incident light into the orthogonal polarized light components, a function of compensating the phase difference of the light wave to obtain a wider field of view and to prevent coloration, a function of diffusing incident light, a function of improving luminance and the like. As the optical sheet group, for example, there are a diffusion sheet, a prism sheet and a polarized light conversion sheet.

In the backlight device 10 having such structure, light in which red, green and blue color were mixed in the light-guiding plate 30 is further dispersed in the diffusion plate 41 and enters the LCD panel 100 as white surface light having even luminance.

Emission angle distribution of light emitted from the LED 21 can be adjusted by a lens of the LED 21. Particularly, when a side-light LED in which light is emitted in the side surface direction of the LED is used, light beams can be guided across a wide area in the light-guiding plate 30.

In the side-light LED 21, though not explained in detail, a light-emitting body of a light-emitting element and the like is individually held by a resin holder and a pair of terminals protrudes from the resin holder. An optical component with which light from the light source is emitted from the side surface is provided in each of LEDs 21 to have directivity in which a major component of the emitted light is emitted in the outer circumference direction of the light-emitting body. For example, the side-light LED is disclosed in Published Japanese Patent Application No. 2003-8068, in Published Japanese Patent Application No. 2004-133391 and in others.

Next, before explaining the state of reflection of light beams in the backlight device according to an embodiment of the present invention, the state of reflection of light beams in the backlight device of the related art is explained.

Figure 4:
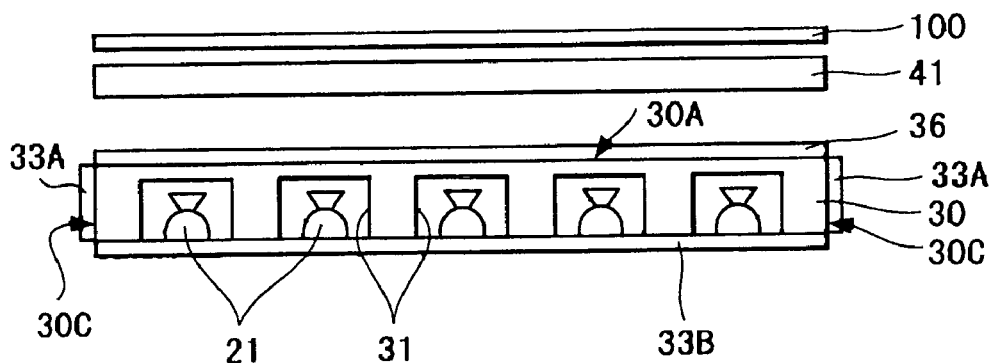
FIG. 4 is a constitutional view schematically showing a section of a relevant part of a backlight device according to an example of the related art.

FIG. 4 shows a constitutional view schematically showing a section of a relevant part of a backlight device of the related art. The backlight device 10 of the related art includes a concave portion 31 in which the LED 21 in a light-guiding plate 30 is housed and which has a cylindrical shape, for example.

Further, a reflection structure portion 33B made of a reflection sheet or the like is provided on the bottom surface 30B of the light-guiding plate 30, and a reflection structure portion 33A is also provided on the side surface 30C. Furthermore, a diffusion structure portion 36 such as a diffusion sheet or the like to diffuse and extract light is provided on the top surface 30A that is a light-emitting surface of the light-guiding plate 30, as described above.

Figure 5:
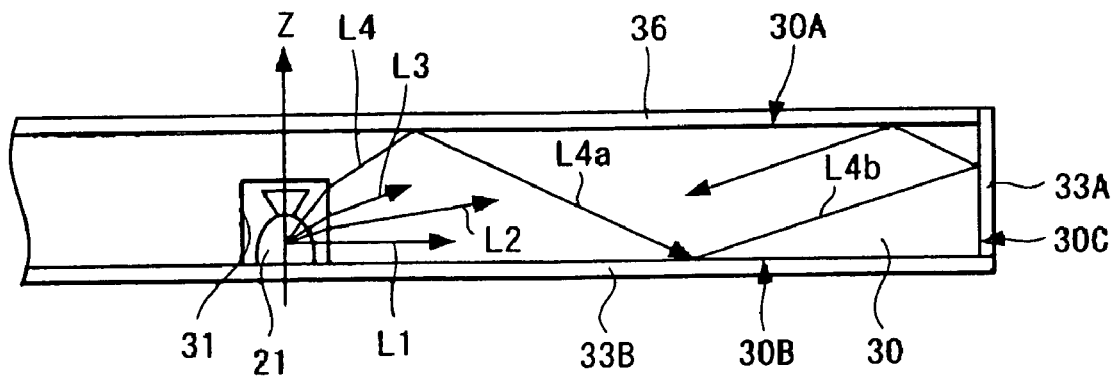
FIG. 5 is an explanatory view showing the state of reflection of light beams of an example of a backlight device according to the related art.

In such a structure, as shown with arrows L1 to L4, L4a, L4b in FIG. 5, light beams emitted from the LED 21 proceed in the light-guiding plate 30 while reflecting on the inner surface of the light-guiding plate 30, and the light beams of three colors are mixed and emitted as white light from the light-guiding plate and enters the LED panel 100. As a material of the light-guiding plate, a colorless transparent resin, for example, an acrylic resin can be used. Distribution of emission angle of the LED 21 can be adjusted by a lens attached to the LED 21, and for example, when the above-described side-light LED is used, the angle can be distributed in the side surface direction appropriately from the perpendicular line indicated by an arrow Z in FIG. 5 and so the light beams can favorably be guided into the light-guiding plate 30. In FIG. 5, the same numerals are given to the portions that correspond to those in FIG. 4 and redundant explanation is omitted.

The light beams having an angle of incidence larger than a total reflection critical angle (that is approximately 42 degrees in the light-guiding plate made of an acrylic resin) repeat the reflection in the light-guiding plate 30, and propagates in the light-guiding plate 30. The light beams emitted from the LED 21 continue to repeat the reflection in the light-guiding plate 30, and so the light beams from the LED 21 propagate in the wide range and on the diffusion structure portion 36 of the top surface 30A is obtained even luminance distribution.

However, among light beams emitted from the LED 21, the light beams having an angle of incidence not included in a possible transmissive angle range in the diffusion structure portion 36 of the top surface 30A repeat specular reflection on the bottom surface 30B and on the side surface 30C of the light-guiding plate 30, as shown with arrows L4, L4a and L4b in FIG. 5, and are in the state of not being emitted from the light-guiding plate 30. Specifically, light beams not emitted from the light-guiding plate 30 may increase, which causes the improvement of luminance of the backlight device 10 to be obstructed.

Figure 6:
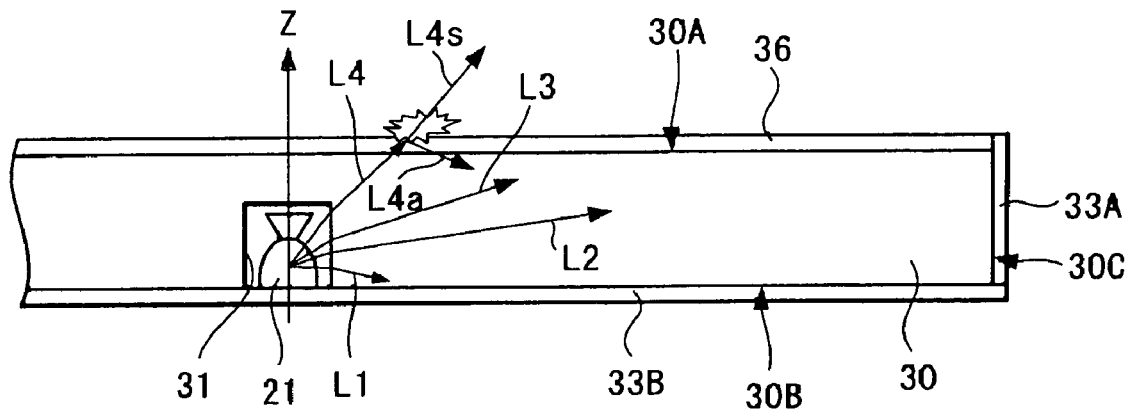
FIG. 6 is an explanatory view showing the state of reflection of light beams of an example of a backlight device according to the related art.

Then, as shown in FIG. 6, with the diffusion structure portion 36 made of a diffusion sheet or the like being provided on the top surface 30A of the light-guiding plate 30, a part of light beams having an angle of incidence larger than the full reflection critical angle of the light-guiding plate 30 can be emitted to the outside and the improvement of luminance of the backlight 10 can be made. However, the light beam L4s emitted directly from the diffusion structure portion 36 increases to become a cause which makes brightness uniformity deteriorate. In FIG. 6, the same numerals are given to the portions that correspond to those in FIGS. 4 and 5, and the redundant explanation is omitted.

Consequently, although light beams emitted from the light-guiding plate 30 may increase with the diffusion sheet or the like of the diffusion structure portion 36, the brightness uniformity deteriorates. Specifically, it is understood that the brightness uniformity becomes a trade-off for the increase of brightness due to the diffusion characteristic of the diffusion structure portion 36 on the top surface of the light-guiding plate 30.

Figure 7:
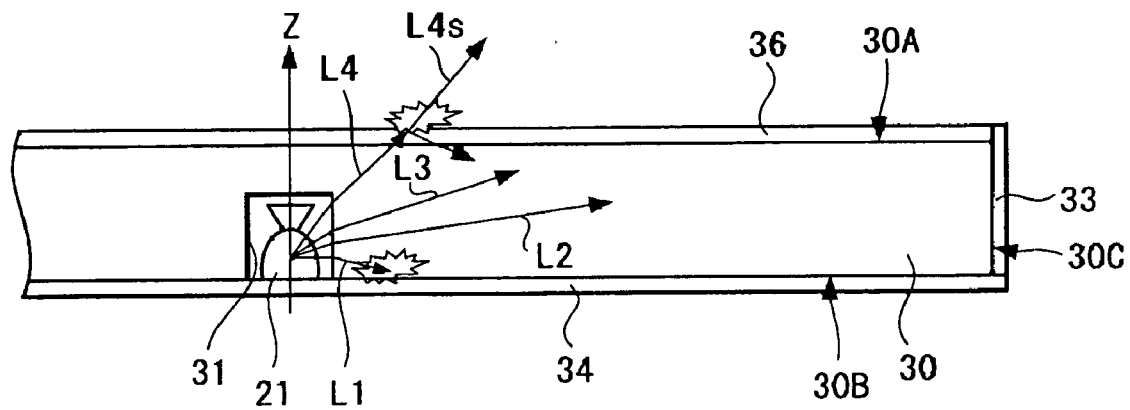
FIG. 7 is an explanatory view showing the state of reflection of light beams of a backlight device according to a comparative example.

In comparison with this, FIG. 7 shows as a comparative example the state of reflection of the light beams in the case where a diffusion reflection structure portion made of a diffusion sheet is provided on the bottom surface 30B of the light-guiding plate 30.

Here, the diffusion reflection structure portion indicates a structure in which transmissivity and a rate of absorption are extremely low, almost all light entered is reflected and most of the light diffuses completely.

As shown in FIG. 7, in the case where on the bottom surface 30B of the light-guiding plate 30 is provided the diffusion reflection structure portion 34 by bonding or the like instead of the reflection structure portion of a specular mirror sheet and the like, an amount of light emitted from the top surface 30A of the light-guiding plate 30 increases, however, as shown with an arrow L1, distribution of luminance in the surroundings of the LED 21 becomes high, which causes the brightness uniformity to deteriorate. The main cause of the deterioration of the brightness uniformity in the surroundings of the LED 21 is that the light beams emitted from the LED 21, as shown with the downward arrow L1 than horizontal, directly reach the diffusion reflection structure portion 34 on the bottom surface 30B to diffuse and reflect. In FIG. 7, the same numerals are given to the portions that correspond to those in FIG. 6 and the redundant explanation is omitted.

Then, according to the embodiment of the present invention, the concave portion 31 where the LED 21 is buried is formed to guide the downward light beams in the horizontal direction.

In other words, in the backlight device 10 according to the embodiment of the present invention, as explained in FIG. 3, an edge portion 32 on the bottom surface 30B side of the concave portion 31 is made to have an inclined or curved surface that has an angle except a right angle with respect to the bottom surface 30B, for example, to have a conical curved surface.

Figure 8:
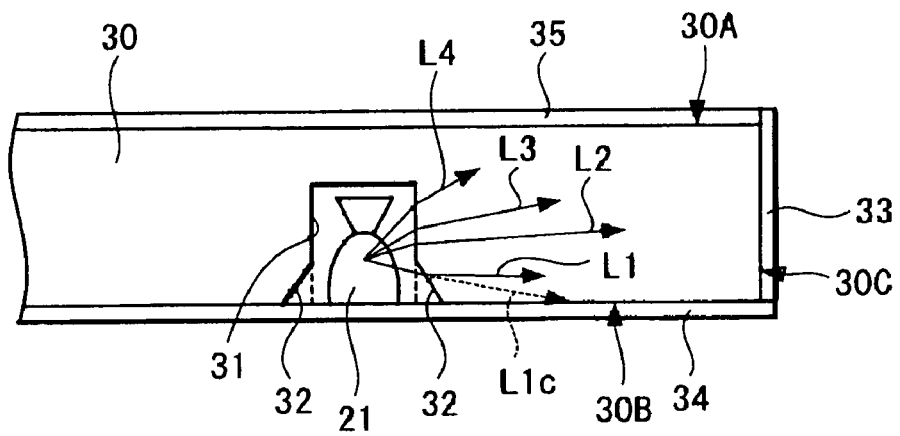
FIG. 8 is an explanatory view showing the state of reflection of light beams of a backlight device according to an embodiment the present invention.

In this case, as shown in FIG. 8, with a lower portion of the concave portion 31 having the conical curved surface, an angle of light entering the light-guiding plate 30 becomes upward as shown with an arrow L1 in comparison with an angle of the incident light beams shown with a broken arrow L1c in the case where the cylindrical concave portion of the related art structure is provided, for example, and the light beams reach the diffusion reflection structure portion 34 on the bottom surface 30B side at the position away from the LED 21 to further reduce distribution of the light beams directly reaching to the diffusion reflection structure portion 34, and therefore the brightness uniformity can be controlled or can be improved. In FIG. 8, the same numerals are given to the portions that correspond to those in FIG. 7 and the redundant explanation is omitted.

Further, the above effectiveness can also be obtained in the case where the edge portion 32 of the concave portion 31 has a pyramid shape.

Furthermore, as shown in FIG. 8, if a section of the concave portion 31 has the shape only formed of a straight line portion in the edge portion 32, it is easy to manufacture the concave portion when the light-guiding plate 30 is formed by injection molding or the like, and a comparatively easy production method such as polishing the edge portion after forming the cylindrical concave portion can be employed.

On the other hand, when light beams emitted upward from the LED 21 as shown with an arrow L4 in FIG. 7, namely, the light beams emitted to the top surface side 30A directly reach the diffusion structure portion 36 on the top surface 30A of the light-guiding plate 30 and diffuse to be transmitted, it becomes a cause of deterioration of brightness uniformity.

Therefore, in the embodiment of the present invention, as shown in FIG. 8, a low diffusion transmission structure portion 35 made of a transmission sheet or the like of less diffusion is provided on the top surface 30A of the light-guiding plate 30, and so luminance can be improved.

Here, the low diffusion transmission structure portion indicates a structure in which transmissivity is high, for example, the transmissivity is approximately 80% or more and most thereof does not diffuse completely and the diffusion is small.

As described above, in the embodiment of the present invention, since the lower edge portion of the concave portion 31 where the LED 21 of the light-guiding plate 30 is assembled has the shape of an inclined or curved surface, an angle of light beams emitted to the lower side and entering the light-guiding plate is turned upward, thereby controlling the brightness unformity. Further since the diffusion reflection structure portion 34 is provided on the bottom surface of the light-guiding plate 31, luminance can be improved.

Furthermore, since the low diffusion transmission structure portion 35 is provided on the top surface 30A of the light-guiding plate 30, brightness uniformity is further controlled and the control of brightness uniformity and the improvement of luminance can further be obtained by the synergy effect.

Specifically, in the case where the above structure is employed, luminance can be controlled and improved with the diffusion reflection structure portion 34 on the bottom surface 30A of the light-guiding plate 30. Also, brightness uniformity is controlled with the shape of the concave portion 31 where the LED 21 is buried and with the diffusion characteristic of the low diffusion transmission structure portion on the top surface 30A. Since the function of controlling the brightness uniformity is separated from the function of improving luminance, the brightness uniformity can be controlled and the improvement of luminance can be obtained more favorably.

Figure 9:
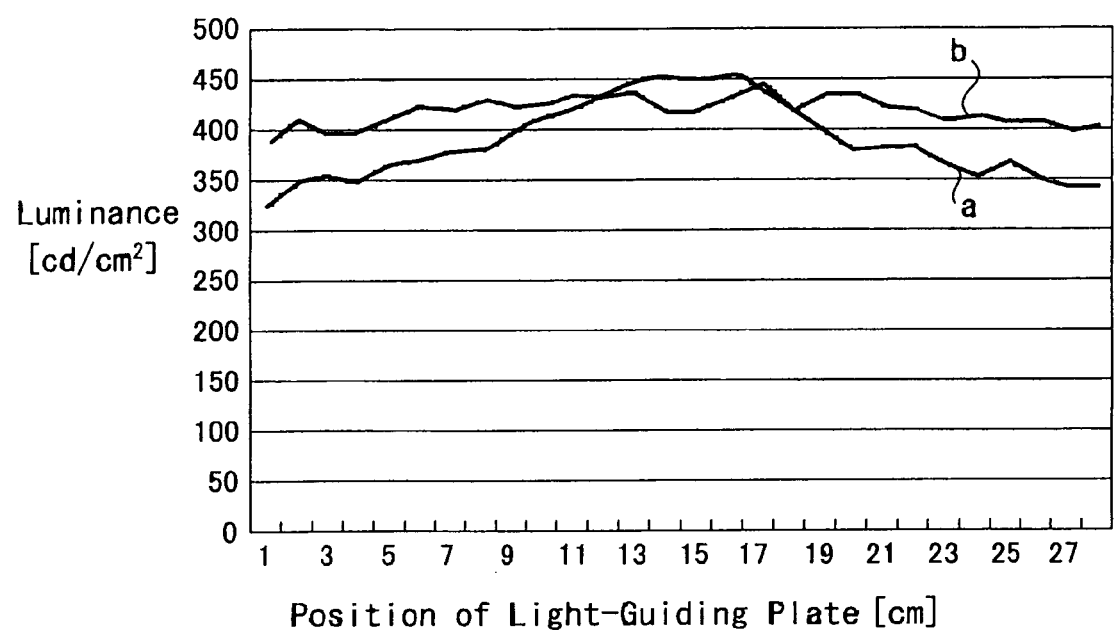
FIG. 9 is a diagram showing the luminance distribution in a backlight device according to an embodiment of the present invention and in a comparative example thereof.
Figure 10A:
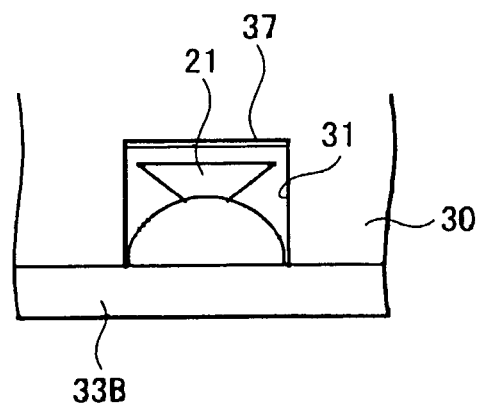
FIG. 10A is a schematic constitutional view of a relevant part of a backlight device of the related art.
Figure 10B:
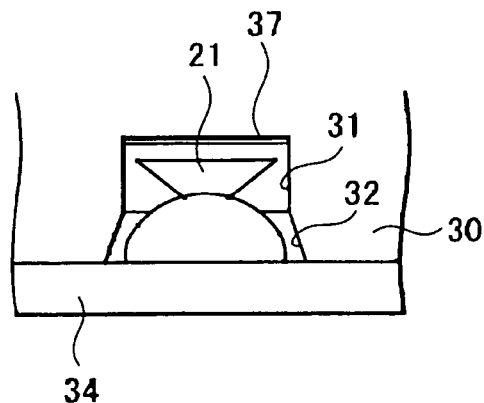
FIG. 10B is a constitutional view schematically showing a section of a relevant part of a backlight device according to an embodiment of the present invention.

FIG. 9 shows a diagram in which the luminance distribution of the above-described backlight device according to the embodiment of the present invention is compared with the luminance distribution of the backlight device of the related art explained in FIG. 4. A solid line "a" in FIG. 9 is an example in which the concave portion 31 where the LED 21 is housed has a cylindrical shape as shown in FIG. 10A in which a section of the relevant part of the backlight device is illustrated. Also, a solid line "b" in FIG. 9 is an example in which the upper portion of the concave portion 31 where the LED 21 is housed has a cylindrical shape and the edge portion 32 on the bottom surface side has a conical shape as shown in FIG. 10B in which a section of the relevant part of the backlight device is illustrated. In each example, the diffusion reflection structure portion is provided on the bottom surface of the light-guiding plate and the low diffusion transmission structure portion is provided on the top surface that is the light-emitting surface and further a reflection portion 37 made of a reflective mirror is provided on top of the LED 21 in the concave portion 31, and the luminance distribution in the light-guiding plate is measured. In FIG. 9, the position of fourteen scales (one scale equals to 5 mm) from the end of the light-guiding plate is a center position of the LED 21.

From the result of FIG. 9, in the backlight device according to the embodiment of the present invention, the luminance in the surroundings of the LED and the luminance of the area away from the LED are equalized in comparison with the comparative example, and it is understood that the brightness uniformity is improved. Furthermore, it is understood that the luminance is also improved.

As explained above, according to the embodiment of the present invention, the brightness uniformity can be controlled or improved and the improvement of the luminance can be performed. Since the brightness uniformity is controlled, the backlight device and LCD apparatus using the backlight device can be made thin and small-sized.

Further, since the diffusion reflection sheet or the like having the uniformity on the whole surface can be used on the bottom surface as the diffusion reflection structure portion provided on the bottom surface of the light-guiding plate, the diffusion reflection structure portion can be manufactured easily in comparison with the case in which the reflection sheet and the like on which light partly diffuses is provided, for example, and the backlight device of comparatively low costs and the LCD apparatus using the backlight device can be obtained.

Note that, the present invention is not limited to the above-described embodiments, and needless to say, various alteration and modification can be made with respect to: the material constitution of the light-guiding plate, the structure of the optical components in the surroundings of the light-guiding plate, kinds and arrangement of light emitting diodes and the like without departing from the spirit and scope of the invention.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A backlight device comprising:
a light emitting diode as a light source assembled into a concave portion of a light-guiding plate such that the light emitting diode is contained within the concave portion,
wherein an upper portion of the concave portion is formed to have a cylindrical shape,
wherein a lower portion of the concave portion is formed to have a shape of an inclined or curved surface that has an angle except a right angle with respect to the a bottom surface of the light guiding plate that faces a light-emitting surface of the light guiding plate, the lower portion positioned on the bottom surface of the light-guiding plate and opposite to the light-emitting surface, and the lower portion having a width that gradually increases in a direction away from the upper portion so as to be wider than a diameter of the cylindrical upper portion, and
wherein the light-guiding plate includes a diffusion reflection structure portion provided in contact with the light emitting diode and the bottom surface, that faces a light-emitting surface of the light-guiding plate and a reflection structure portion provided on a side surface of the light-guiding plate.

2. The backlight device according to claim 1, wherein a low diffusion transmission structure portion is provided on a top surface that is a light-emitting surface of said light-guiding plate.

3. The backlight device according to claim 1, wherein said light emitting diode is a side-light light emitting diode that emits light in a direction of a side surface.

4. The backlight device according to claim 2, wherein said light emitting diode is a side-light light emitting diode that emits light in a direction of a side surface.

5. The backlight device according to claim 1, wherein the shape of the lower portion of the concave portion is configured such that at least a portion of light emitted from the light emitting diode and entering the light-guiding plate through the lower portion of the concave portion is redirected to a lesser angle relative to the bottom surface of the light-guiding plate.

6. A liquid crystal display apparatus comprising:
a transmissive liquid crystal display panel, and
a backlight device that illuminates said liquid crystal display panel with white light from a rear surface side,
wherein the backlight device includes a light emitting diode as a light source assembled into a concave portion of a light-guiding plate such that the light emitting diode is contained within the concave portion,
wherein an upper portion of the concave portion is formed to have a cylindrical shape,
wherein a lower portion of the concave portion is formed to have a shape of an inclined or curved surface that has an angle except a right angle with respect to the a bottom surface of the light guiding plate that faces a light-emitting surface of the light guiding plate, the lower portion positioned on the bottom surface of the light-guiding plate and opposite to the light-emitting surface, and the lower portion having a width that gradually increases in a direction away from the upper portion so as to be wider than a diameter of the cylindrical upper portion, and
wherein the light-guiding plate includes a diffusion reflection structure portion provided in contact with the light emitting diode and the bottom surface, that faces a light-emitting surface of the light-guiding plate and a reflection structure portion provided on a side surface of the light-guiding plate.

7. A liquid crystal display apparatus according to claim 6, wherein the shape of the lower portion of the concave portion is configured such that at least a portion of light emitted from the light emitting diode and entering the light-guiding plate through the lower portion of the concave portion is redirected to a lesser angle relative to the bottom surface of the light-guiding plate.

* * * * *